US010395570B2

(12) United States Patent
Wang

(10) Patent No.: US 10,395,570 B2
(45) Date of Patent: Aug. 27, 2019

(54) MARK AND SIGN LIGHTING DEVICE, METHOD AND SYSTEM

(71) Applicant: Panlong Wang, Changzhou (CN)

(72) Inventor: Panlong Wang, Changzhou (CN)

( * ) Notice: Subject to any disclaimer, the term of this patent is extended or adjusted under 35 U.S.C. 154(b) by 66 days.

(21) Appl. No.: 15/329,912

(22) PCT Filed: Aug. 4, 2015

(86) PCT No.: PCT/CN2015/086035
§ 371 (c)(1),
(2) Date: Jan. 27, 2017

(87) PCT Pub. No.: WO2016/019852
PCT Pub. Date: Feb. 11, 2016

(65) Prior Publication Data
US 2017/0278439 A1 Sep. 28, 2017

(30) Foreign Application Priority Data

Aug. 5, 2014 (CN) .......................... 2014 1 0389180

(51) Int. Cl.
*F21V 8/00* (2006.01)
*G09F 13/16* (2006.01)
(Continued)

(52) U.S. Cl.
CPC ........... *G09F 13/16* (2013.01); *G02B 6/0055* (2013.01); *G09F 13/18* (2013.01); *G09F 13/22* (2013.01);
(Continued)

(58) Field of Classification Search
CPC .......... G09F 13/16; G09F 13/18; G09F 13/22; G02B 6/0055
See application file for complete search history.

(56) References Cited

U.S. PATENT DOCUMENTS

| 2009/0056183 A1 | 3/2009 | Reiland et al. |
| 2010/0321919 A1 | 12/2010 | Yang |
| 2013/0135896 A1 | 5/2013 | Kuo |

FOREIGN PATENT DOCUMENTS

| CN | 2630634 | 8/2004 |
| CN | 101140721 | 3/2008 |

(Continued)

OTHER PUBLICATIONS

International Search Report issued in International Application No. PCT/CN2015/086035 dated Oct. 22, 2015 (7 pages).

(Continued)

*Primary Examiner* — Thomas M Sember
(74) *Attorney, Agent, or Firm* — Hamre, Schumann, Mueller & Larson, P.C.

(57) ABSTRACT

A mark and sign illuminating device and system. The device is a device in which a transparent light guide layer (1203), a light reflecting layer (1204) and border rims (1251, 1252) are formed integrally. An LED illuminating light source LED1 and an LED illuminating light source LED2 are provided in the transparent light guide layer (1203). The reflective layer (1204) is provided with overlapping incidence of effective incident angles within the range of 360 degrees in the transverse direction and within the range of about 1 degree to about 179 degrees in the longitudinal direction, so that wide effective reflection angles and observation angles are formed. The advantage is that marks, signs and warning marks can be identified, seen and read more easily.

19 Claims, 13 Drawing Sheets

(51) Int. Cl.
　　　*G09F 13/18*　　　(2006.01)
　　　*G09F 13/22*　　　(2006.01)
(52) U.S. Cl.
　　　CPC ............... *G09F 2013/1831* (2013.01); *G09F 2013/1881* (2013.01); *G09F 2013/222* (2013.01)

(56) References Cited

FOREIGN PATENT DOCUMENTS

| CN | 201594367 | 9/2010 |
| CN | 102831847 | 12/2012 |
| CN | 204390665 | 6/2015 |
| JP | 2005-322611 | 11/2005 |
| JP | 2010-056089 | 3/2010 |
| JP | 2010147012 | 7/2010 |
| JP | 2011158874 | 8/2011 |
| JP | 2011-527771 | 11/2011 |
| JP | 2012-521064 | 9/2012 |
| JP | 2012-531047 | 12/2012 |
| WO | 2005/017407 | 2/2005 |

OTHER PUBLICATIONS

Written Opinion issued in International Application No. PCT/CN2015/086035 dated Oct. 22, 2015 (5 pages).
European Search Report issued in corresponding European Application No. 15830513.6 dated Oct. 7, 2018 (12 pages).
Japanese Office Action, issued in the corresponding Japanese patent application 2017-526738, dated Apr. 18, 2019, 11 pages.

MARK AND SIGN LIGHTING DEVICE, METHOD AND SYSTEM

BACKGROUND

Technical Field

The present invention relates to an illuminating mark and sign, particularly to a portable mark, a warning mark, a motor and non-motor vehicle warning mark, a traffic signboard, a billboard and similar reflective mark and sign illuminating device, method and system.

Related Art

With the urbanization process over decades after the reform and opening up, the increase in vehicles enables traffic roads to be broadened significantly. The increase in vehicle types enables light reflecting marks and signs currently used as traffic signboards to be mounted at a quite high position above the roads, and generally they do not have a wide observation angle. When motor vehicles generally travel on an urban street, front lamps thereof have lamplight pointed downward, i.e. a low beam, and especially in an area having multiple lanes and large traffic flow, there is generally quite few amount of light emitted by the front lamps to point toward light reflecting marks and signs. Drivers cannot have a clear understanding when identifying and reading marks and signs. In an urban district, there are generally many street lamps, building illuminating and traffic signs beside traffic lights as well as neon lights, especially in rainy days and haze days, they severely interfere with the abilities of the drivers to see and read the marks and signs. In order to improve the abilities of the drivers to identify and read the marks and signs, the marks and signs should be provided with a ring illuminating light source and a wide incident angle illuminating light source.

The examples of existing signs being illuminated by independent illuminating light sources have: for example, lamps (generally fluorescent lamps) performing independent illumination at an angle in a near distance at an upper end of a sign; or illuminating light sources independently illuminating a guideboard at an angle in a near distance from underneath, characterized in that independent illuminating light sources are all mounted at an extension part on a post for fixing the guideboard. These illuminating sources and methods for illuminating a guideboard are all based on a JIS and Japanese guideboard installation standard regulations. Patent number: 95194507.6, 3M Corporation in America illustrates an example of an illuminating system for road signs, and although a point of a road sign illuminated by an illuminating source is updated and positioned, it is still characterized by illumination with an independent illuminating source. The guideboards illuminated by separate illuminating sources, under the action of a light reflection property, can only draw attention of drivers when they reaching a longer distance and a large visual angle range, but cannot be viewed clearly and easily read in a shorter distance because front lamp light sources of non-driving vehicles and front lamp light sources of driving vehicles collide with an incident angle of an independent illuminating source because of a light source incident angle.

The following technical disclosures are only about manufacturing refining of reflecting property, process and material: U.S. Pat. No. 4,726,134 (Woltman) discloses an improved roadway sign, in which light reflecting properties of mark and background parts on the surface of the sign are selected, so that the sign draws attention when being seen in a longer distance and is viewed clearly and easily read in a shorter distance. U.S. Pat. No. 4,957,335 (Kuney) discloses selecting a microsphere from a microsphere-based light reflecting object so as to improve the light reflecting brightness at a narrow observation angle. Japan Patent application No. 6-9426/94 (Nakajima) filed on Apr. 7, 1994 discloses a microsphere-based light reflecting plate, comprising two classes of microspheres for providing good light reflecting performances at a narrow observation angle and a wide observation angle.

It is difficult for optical bodies, which are transparent micro-spheres (beads) and light reflecting finished products thereof as the main technical representatives in the 90s in last century, to achieve a warning function in long-distance, large visual angle and weak light source environments in practical applications.

In addition, the motor vehicle warning marks (warnings sent by vehicles to front and rear directions), which are taken as the main technical representatives in nearly the hundred-year history, have hardly embody an omnidirectional warning function in crowded multiple lanes and large traffic flow.

Following a principles for a people oriented harmonious society, when considering enabling motor vehicles with an illuminating light source to obtain much more security and warnings, we should more provide comprehensive traffic indications of marks and signs and vehicle warnings for non-motor vehicles and pedestrians without an illuminating light source, and need a better illuminating system to enable traffic indications of marks and signs and vehicle warning devices, etc. to draw attention at a longer distance and within a large visual angle range, and to be viewed clearly and easily read in a shorter distance.

SUMMARY

The present invention provides a mark and sign illuminating device and method, as well as a mark and sign illuminating system. The present invention is particularly applicable to a portable mark, a warning mark, a motor and non-motor vehicle warning mark, a traffic signboard, a billboard and other similar marks and signs.

The illuminating mark, sign and warning mark device system of the present invention comprises a mark and sign having a light reflecting sign surface transparent layer and an LED illuminating light source in an annular transparent layer, and with regard to the mark, sign and warning mark, an LED illuminating light source is placed in the transparent layer around the surface, so that light emitted from the light source is incident into the mark and sign surface transparent layer at an incident angle ranging from about 1 degree to about 179 degrees. The mark, sign and warning mark surface is a transparent layer with a thickness of 2-10 mm, the lowed end of the transparent layer is a light reflecting layer part, and this part has wide effective incident angles and wide light reflecting effective observation angles of the LED illuminating light sources.

The surface transparent layer of the mark, sign and warning mark and the light reflecting part at the lower end as well as an outer surface of the warning mark bottom board are provided with frame rims, inner sides of the frame rims have a light reflective material or a light reflective coating, the frame rims are packaged inward in a C shape, and a geometric prism layer or an arc-shaped reflecting sheet layer can exist in the inner sides of the frame rims. The LED illuminating light source in an annular transparent layer is incident into the mark, sign and warning mark surface transparent layer at an incident angle ranging from about 1 degree to about 179 degrees, the LED illuminating light source is comprehensively reflected through the light reflecting layer part at the lowed end of the transparent layer and the light reflective material, the light reflective coating or the geometric prism layer and the inner arc-shaped reflecting sheet layer, so that an LED illuminating comprehensive light source in the annular transparent layer of the mark, sign and warning mark is overlapped and incident into the light reflecting layer part at the lowed end of the surface transparent layer of the mark, sign and warning mark at an incident angle ranging from about 1 degree to about 179 degrees and is intensively reflected by the overlap incident angle via the light reflecting layer, so as to form wide effective reflection angles and observation angles, thereby drawing attention at a longer distance and within a large visual angle range.

Since an LED illuminating light source incident angle comprehensively reflected by the LED illuminating light source to the light reflecting layer part at the lowed end and the light reflective material, the light reflective coating or the geometric prism layer and the inner arc-shaped reflecting sheet layer via the transparent layer has no conflict with incident angles of high and low intensity light beams of lamplight of front lamps when a motor vehicle is travelling, personnel comprising the driver in the motor vehicle can pay attention to an object at a longer distance and within a large visual angle range, and can clearly view and easily read in a shorter distance; and since the LED illuminating light source is comprehensively reflected to the light reflecting layer part at the lowed end and the light reflective material, the light reflective coating or the geometric prism layer and the inner arc-shaped reflecting sheet layer via the transparent layer and is overlapped and incident at an incident angle ranging from about 1 degree to about 179 degrees so as to form wide effective intensive reflection angles and observation angles, this provides traffic indications of safety marks and signs and warning marks which focus on visuality for non-motor vehicles and pedestrians without an illuminating light source.

The LED illuminating lamp beads in the annular transparent layer are monitored by a CPU module, and when a problem occurs to a single LED illuminating lamp bead therein, the CPU monitoring module will timely drive reserved LED illuminating lamp beads to emit light. The CPU module monitors the whole device system circuit, comprising: electronic elements and components, such as a switch, a photosensitive sensing switch, a rain sensing switch, an infrared sensing switch, an ultrasonic sensing switch, a power supply module, a battery and a communication transmission module, and completes intelligent control over the mark, sign and warning mark lamp light and transmits, in real time, the data monitored by the CPU module.

The illuminating mark, sign and warning mark device and method and system of the present invention are suitable for the shape of large and small area, and flexibly employs mains power and electric energy generated by solar and wind, and matched mark, sign and warning marks are widely distributed and applied all over the world.

BRIEF DESCRIPTION OF THE DRAWINGS

The present invention will be better illustrated with reference to the accompanying drawings.

These idealized and disproportional figures listed above are merely exemplary but not restrictive.

DETAILED DESCRIPTION

In order to enable light of an LED illuminating light source from an annular transparent layer to be reflected by a light reflecting layer part so as to be seen by drivers and pedestrians, so that mark, signs and warning marks are more easily seen and read, the mark, signs and warning marks should reflect light at an observation angle, wherein when the observation angle is suitable for reflecting the light from an automobile front lamp with the brightness being greater than the LED illuminating light source in the annular transparent layer, light easily seen by an automobile driver and reflected by a light reflecting material is generally extended into a light cone observation angle pointing backward to a starting point of light rays; In addition, because the LED illuminating light source in the annular transparent layer is provided with overlapping incidence of incident angles ranging from about 1 degree to about 179 degrees, so as to form wide effective intensive reflection angles and observation angles, the drivers and pedestrians out of the observation angle ranging from about 1 degree to about 179 degrees pay attention when reaching a longer distance and a large visual angle range.

Figure 1:
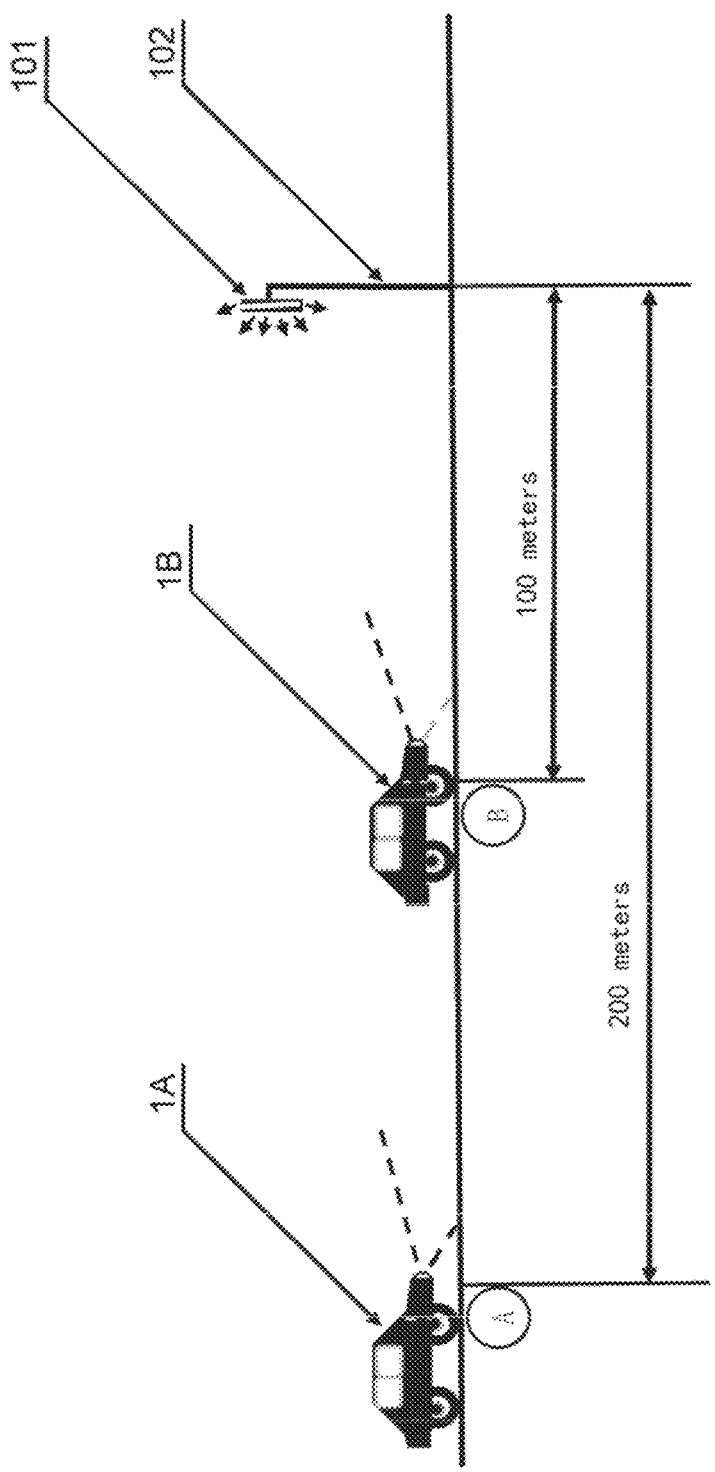
FIG. 1 illustrates that the present invention typically draws attention at a longer distance and within a large visual angle range when a vehicle is travelling on the road.
Figure 2:
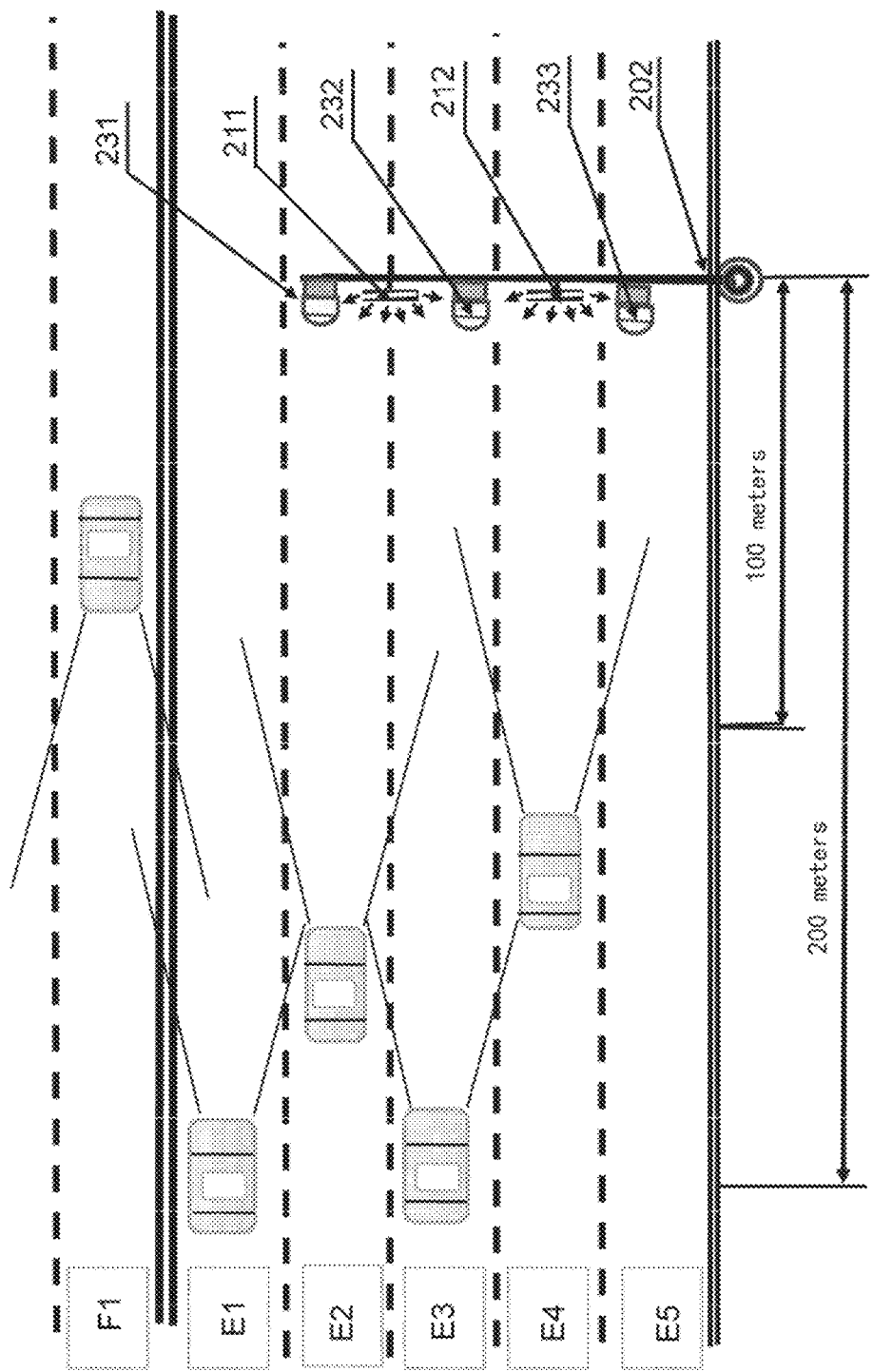
FIG. 2 illustrates that the present invention typically draws attention at a longer distance and within a large visual angle range in crowded traffic flow and backlight environments.

FIGS. 1 and 2 illustrate that, when vehicles travelling on the road and in crowded traffic flow and backlight environments, conventionally: warning marks 101, 211, 212 are generally mounted on a warning mark fixing post 102 and a traffic signal fixing post 202, and because of the increase in vehicle categories, light reflecting marks and signs currently used as traffic signboards are mounted on a quite high position above the road; since the light reflecting marks and signs currently used as the traffic signboards are mounted by means of the traffic signal fixing post 202, traffic signal lamps 231, 232, 233 directly influence light reflecting observation on the traffic signboards when flashing working; significant widening of urban traffic roads enables that the warning mark fixing post 102 and the traffic signal fixing post 202 are far away from a forward-direction visual angle of vehicle drivers, and cannot perform subjective confirmation on traffic signboard classes; vehicles travelling in lanes E1, E2, E3, E4, E5 influence an observation visual angle of drivers, and lamplight in lanes E1 and F1 is opposite to each other, thereby seriously influencing the vehicle drivers to see and read the traffic signboard classes; and when motor vehicles travel generally on the urban street road, the lamplight of front lamps thereof points downward, i.e. a low beam, especially in an area having multiple lanes and large traffic flow, for example, in a distance segment A, there is generally quite few amount of light emitted by the front lamps to point toward light reflecting marks and signs, and only quite a few of light emitted from an illuminating light source of a vehicle is reflected from a sign to a driver, and therefore, the surfaces of conventional traffic signboard classes do not have wide effective observation angles, and in a distance segment B, an included angle of light emitted by the front lamps to point toward light reflecting marks and signs is relatively small, and only quite a few of light emitted from an illuminating light source of a vehicle is reflected from a sign to a driver, and therefore, the surfaces of conventional traffic signboard classes do not have wide effective observation angles.

The present invention has one advantage of more easily identifying, seeing and reading a mark, a sign and a warning mark, changing a reflection establishment condition of reflective marks, and providing overlapping incidence of effective incident angles ranging from about 1 degree to about 179 degrees to a light reflecting layer part on a lower end of a mark, sign and warning mark transparent layer by an LED illuminating light source in an annular transparent layer on the mark, the sign and the warning mark. After wide effective reflection angles and observation angles are formed, they can draw attention and are easy to be identified when drivers and pedestrians reach a longer distance and a large visual angle range.

Accordingly, drivers of travelling vehicles 1A, 1B and pedestrians can all see, identify and read warning marks 101, 211, 212 at a longer distance and within a large visual angle range in crowded traffic flow and backlight environments, in a distance segment A of the road, in a distance segment B of the road, in lanes E1, E2, E3, E4, E5, F1, etc.

Figure 3:
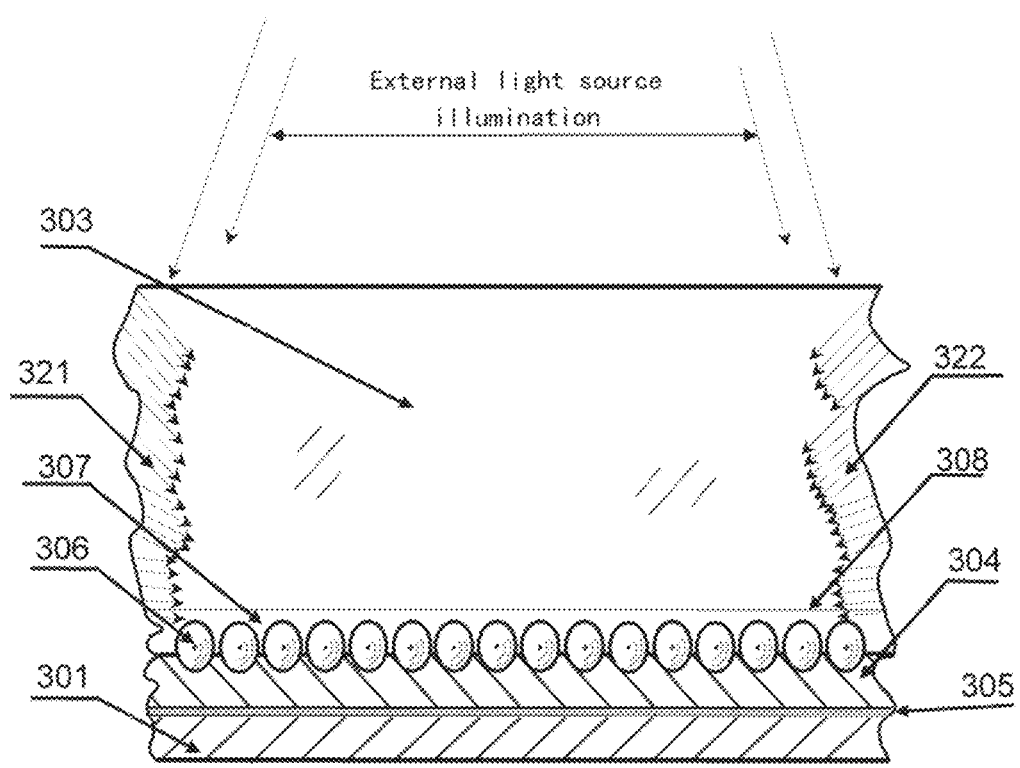
FIG. 3 is a diagram illustrating the case where a transparent light guide layer and a light reflecting layer part are formed by fusion of finished light reflecting layer micro beads and a warning mark bottom board.
Figure 4:
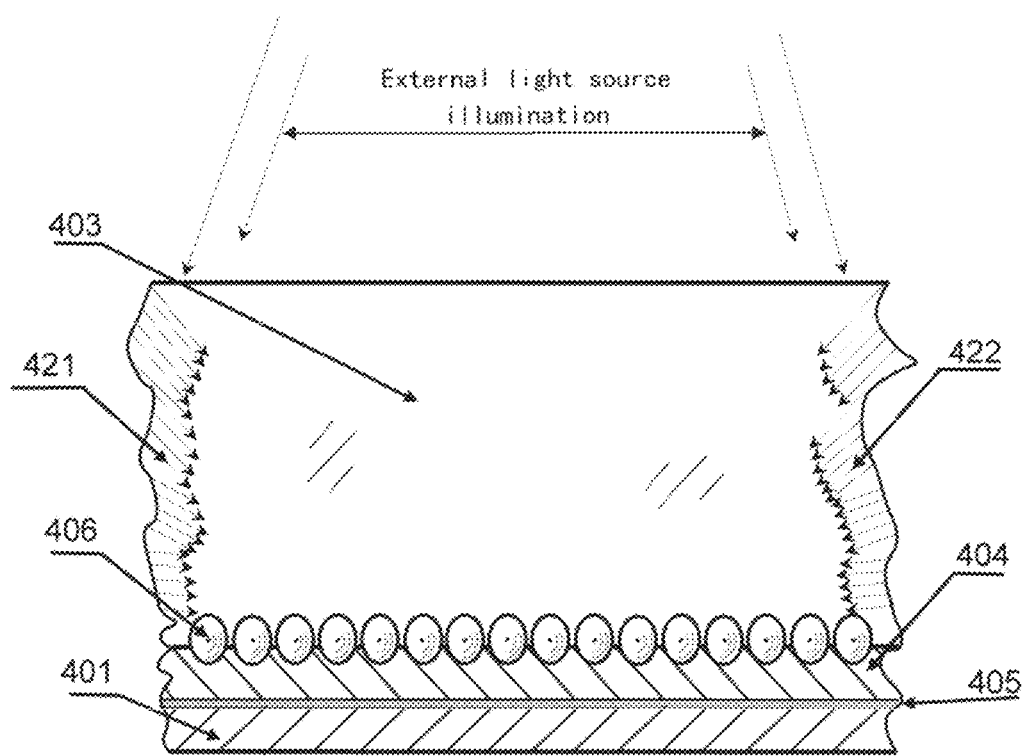
FIG. 4 is a diagram illustrating the case where a transparent light guide layer and a light reflecting layer part are formed by fusion of semi-finished light reflecting layer micro beads and a warning mark bottom board.

FIGS. 3 and 4 illustrate that an example of transparent light guide layers 303, 403 being adhered to finished light reflecting layer 306 and semi-finished light reflecting layer micro beads 406 at a light reflecting layer part is performing casting fusion; and an example of light reflecting layer base planes 304, 404 of the finished light reflecting layer 306 and the semi-finished light reflecting layer micro beads 406 being adhered to light reflecting layer adhesive planes 305, 405 and warning mark bottom boards 301, 401 is adherence fitting.

When the transparent light guide layer 303 is poured, casting fusion is directly performed on a light reflecting layer light guide fusion plane 308, and the fusion of a transparent layer 307 at an upper end of the finished light reflecting layer 306 with the transparent light guide layer 303 does not have obstruction and refraction on incident light.

There are light rays to LED lamplight light sources and LED lamplight light reflecting light sources 321, 322 and 421, 422 of an inner central point (line) at the periphery of the transparent light guide layers 303, 403, the finished light reflecting layer 306 and semi-finished light reflecting layer micro beads 406 at the light reflecting layer part are subjected to overlapping incidence of surrounding lamplight of the LED lamplight light sources and the LED lamplight light reflecting light sources 321, 322 and 421, 422 at inward effective incident angles within a range of 360 degrees in a traverse direction and a range of about 1 degree to about 179 degrees in a longitudinal direction, and the finished light reflecting layer 306 and semi-finished light reflecting layer micro beads 406 form wide effective reflection angles and observation angles.

FIGS. 3 and 4 explicitly show that finished light reflecting layer 306 and semi-finished light reflecting layer micro beads 406 are subjected to overlapping incidence light of effective incident angles of LED lamplight from a range of 360 degrees in a traverse direction and a range of about 1 degree to about 179 degrees in a longitudinal direction, and the overlapping incidence light is different from an external illuminating light source in continuous illumination intensity within a time period; and observation angles with light reflected by an object being extended into a light cone pointing backward to a starting point of light rays are different. The overlapping incident light of an LED lamplight light source and an LED lamplight light reflecting light source at effective incident angles on the finished light reflecting layer 306 and semi-finished light reflecting layer micro beads 406 has no mutual exclution loss with an external illuminating incident light source.

Figure 5:
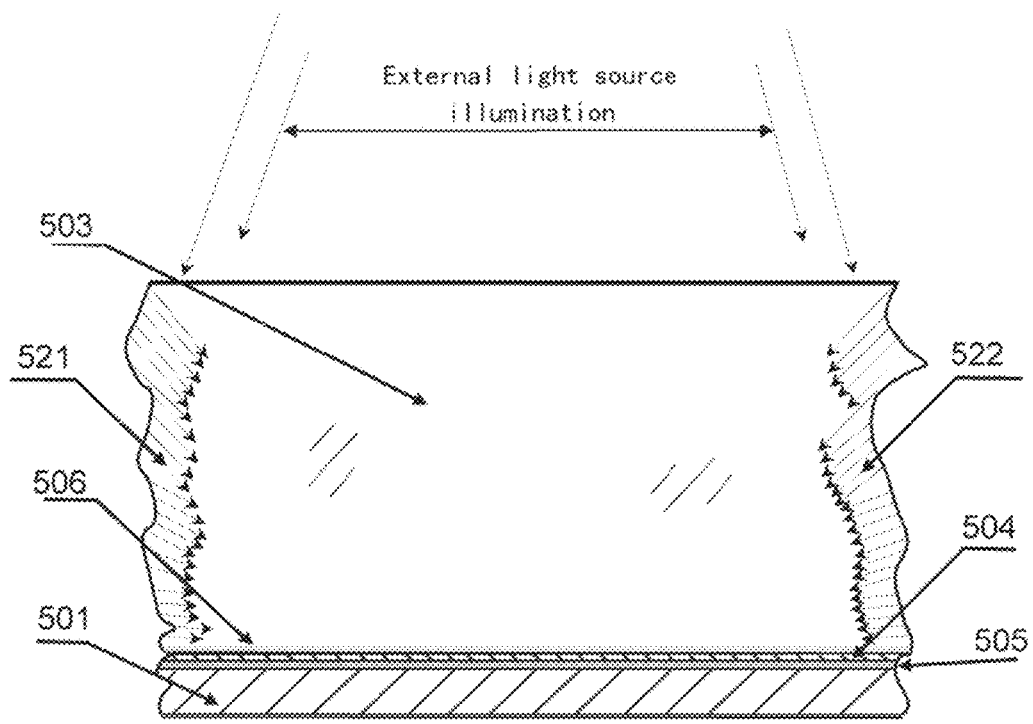
FIG. 5 is a diagram illustrating the case where a transparent light guide layer and a light reflecting layer part are formed by adhesion of a finished light reflecting printed layer and a warning mark bottom board.
Figure 6:
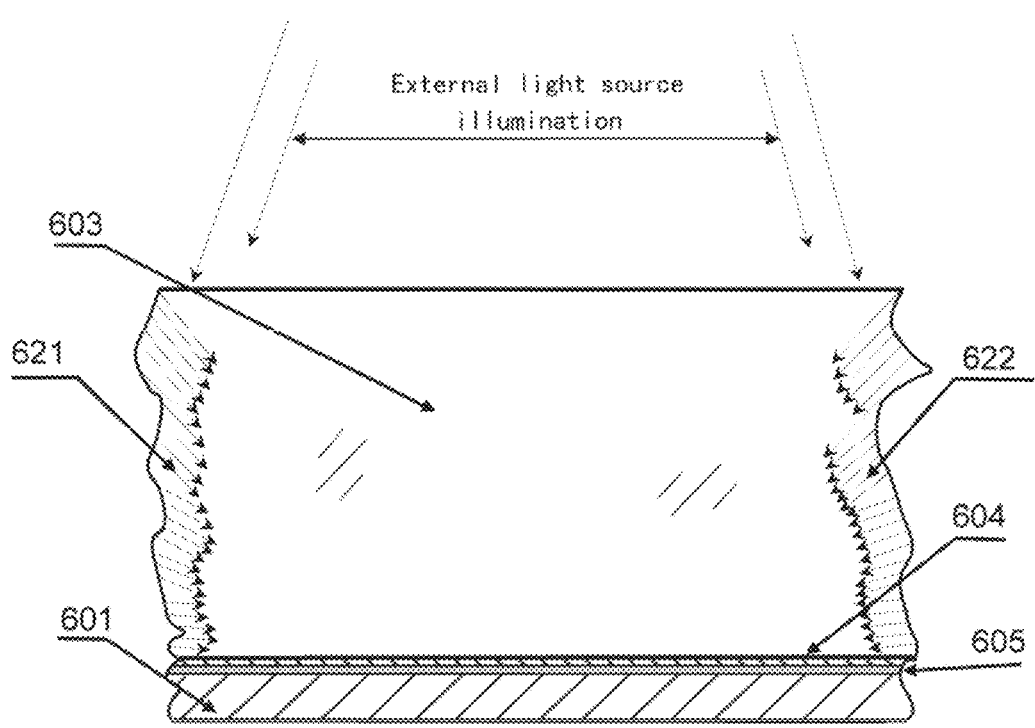
FIG. 6 is a diagram illustrating the case where a transparent light guide layer and a light reflecting layer part are formed by fusion of a finished light reflecting printed layer and a warning mark bottom board.

FIGS. 5 and 6 illustrate that an example of a transparent light guide layer 503 being adhered to a light reflecting printed layer base plane 504 via an adhesive plane 506 is adherence fitting, and an example of a transparent light guide layer 603 being adhered to a light reflecting printed layer base plane 604 is performing casting fusion; and an example of the light reflecting printed layer base planes 504, 604 being adhered to the light reflecting printed layer adhesive planes 505, 605 and warning mark bottom boards 501, 601 via a bottom plate is adherence fitting.

When the transparent light guide layer 603 is poured, casting fusion is directly performed on the light reflecting printed layer base plane 604. The casting fusion of the light reflecting printed layer base plane 604 with the transparent light guide layer 603 does not have obstruction and refraction on incident light; and The transparent light guide layer 503 is adhered and fitted to the light reflecting printed layer base plane 504 via the adhesive plane 506, which does not have obstruction and refraction on incident light.

There are light rays to LED lamplight light sources and LED lamplight light reflecting light sources 521, 522 and 621, 622 of an inner central point (line) at the periphery of the transparent light guide layers 503, 603, the light reflecting printed layer base planes 504, 604 are subjected to overlapping incidence of surrounding lamplight of the LED lamplight light sources and the LED lamplight light reflecting light sources 521, 522 and 621, 622 at effective incident angles within a range of 360 degrees in a traverse direction and a range of about 1 degree to about 179 degrees in a longitudinal direction, and the light reflecting printed layer base planes 504, 604 form wide effective reflection angles and observation angles.

FIGS. 5 and 6 explicitly show that the light reflecting printed layer base planes 504, 604 are subjected to overlapping incidence light of effective incident angles of LED lamplight from a range of 360 degrees in a traverse direction and a range of about 1 degree to about 179 degrees in a longitudinal direction, and the overlapping incidence light is different from an external illuminating light source in continuous illumination intensity within a time period; and observation angles with light reflected by an object being extended into a light cone pointing backward to a starting point of light rays are different. The overlapping incident light of effective incident angles of an LED lamplight light source and an LED lamplight light reflecting light source on light reflecting printed layer base planes 504, 604 has no mutual exclusion loss with an external illuminating incident light source.

Figure 7:
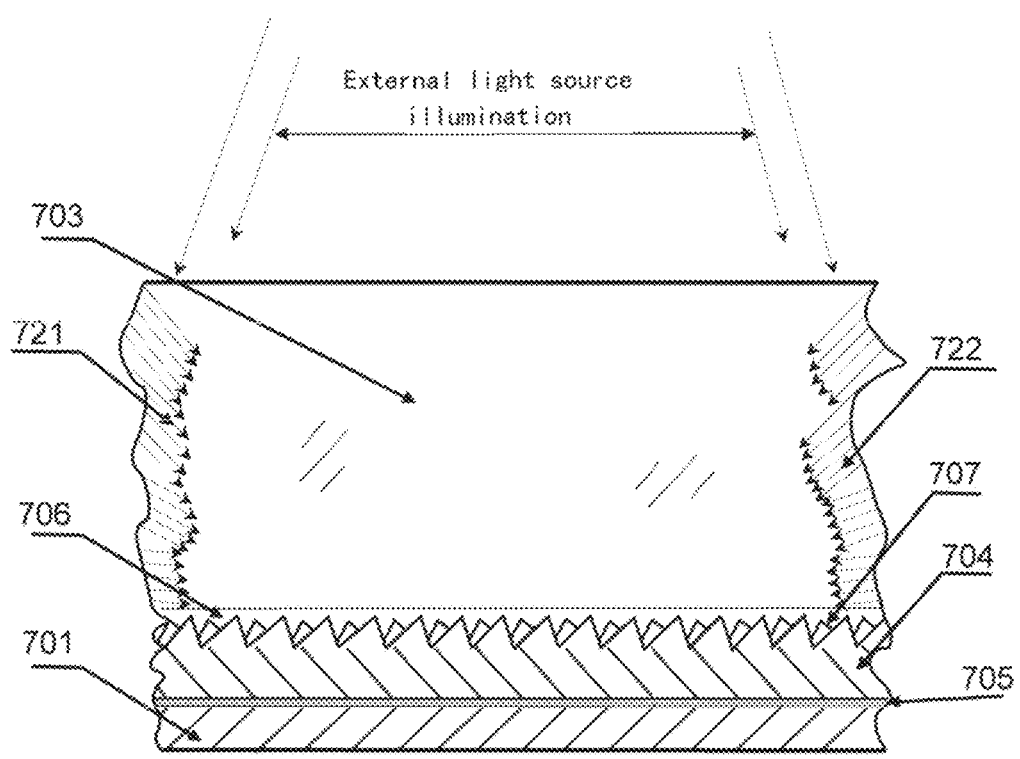
FIG. 7 is a diagram illustrating the case where a transparent light guide layer and a light reflecting layer part are formed by fusion of a finished light reflecting prism sheet and a warning mark bottom board.
Figure 8:
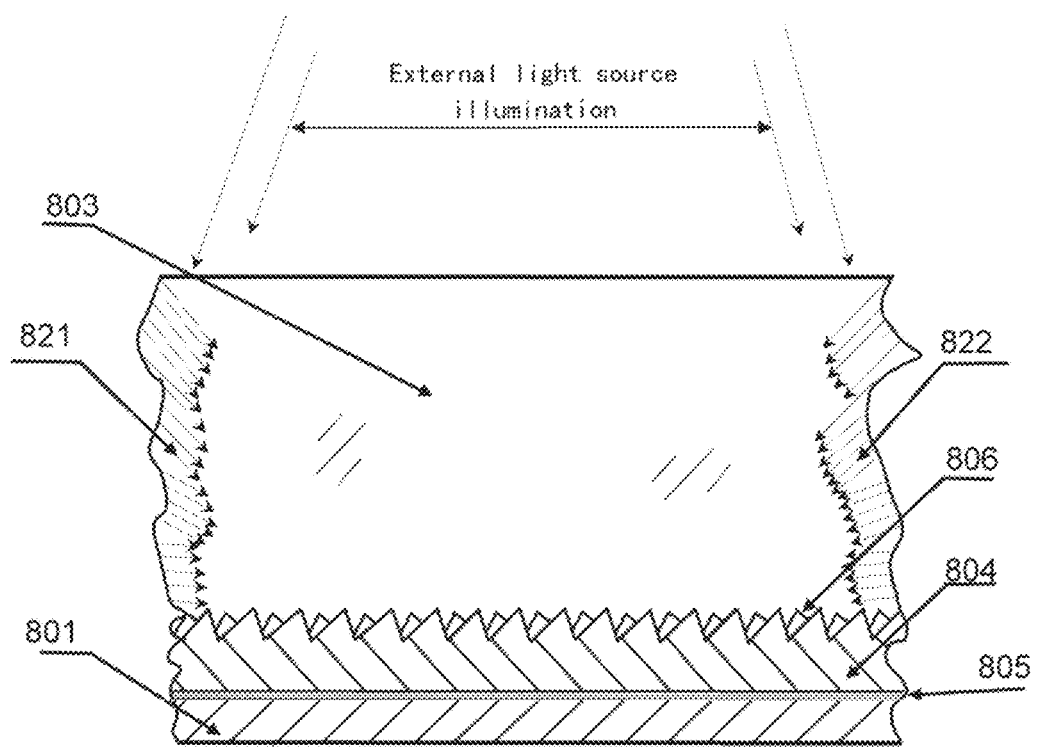
FIG. 8 is a diagram illustrating the case where a transparent light guide layer and a light reflecting layer part are formed by fusion of a semi-finished light reflecting prism sheet and a warning mark bottom board.
Figure 9:
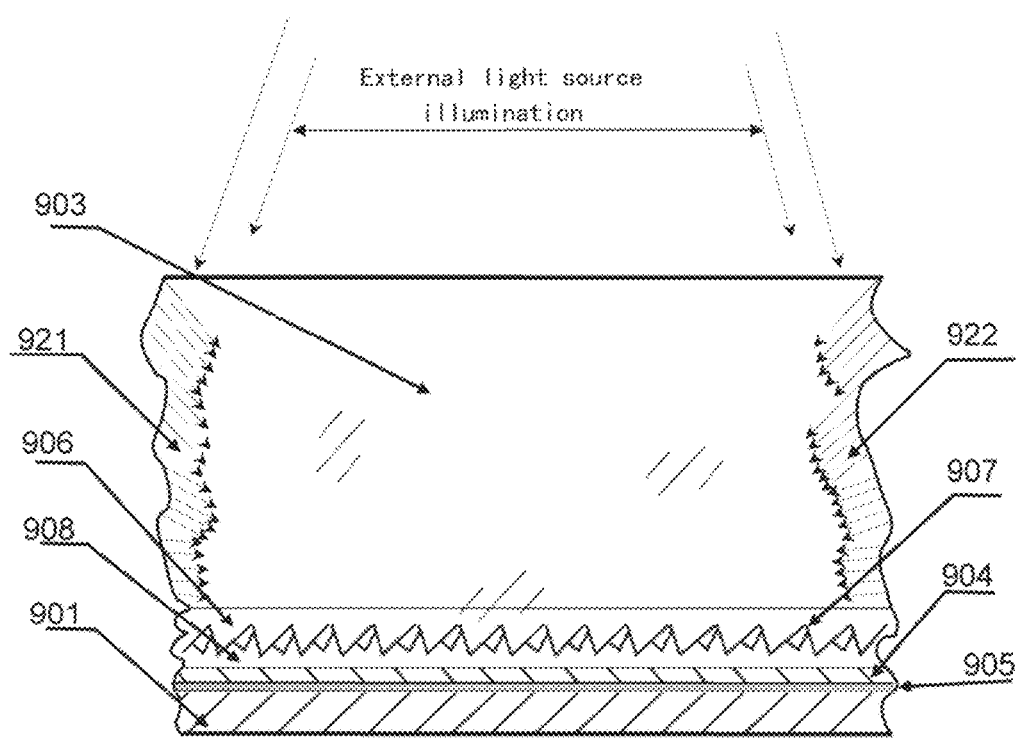
FIG. 9 is a diagram illustrating the case where a transparent light guide layer and a light reflecting layer part are formed by fusion of a hollow light reflecting prism sheet and a warning mark bottom board.

FIGS. 7, 8 and 9 illustrate that an example of transparent light guide layers 703, 803, 903 being adhered to transparent layers 706, 906 at an upper end of a light reflecting layer and a light reflecting prism sheet 806 is performing casting fusion; and an example of the light reflecting layer base planes 704, 804, 904 being adhered to the light reflecting layer adhesive planes 705, 805, 905 and warning mark bottom boards 701, 801, 901 via a bottom plate is adherence fitting.

After the transparent light guide layers 703, 903 are in casting fusion with transparent layers 706, 906 at an upper end of the light reflecting layer, this does not have obstruction and refraction on incident light.

There are light rays to LED lamplight light sources and LED lamplight light reflecting light sources 721, 722 and 821, 822 as well as 921, 922 of an inner central point (line) at the periphery of the transparent light guide layers 703, 803, 903, the inner light reflecting prism sheets 707, 907 and the light reflecting prism sheet 806 in the light reflecting layer are subjected to overlapping incidence of surrounding lamplight of the LED lamplight light sources and the LED lamplight light reflecting light sources 721, 722 and 821, 822 as well as 921, 922 at effective incident angles within a range of 360 degrees in a traverse direction and a range of about 1 degree to about 179 degrees in a longitudinal direction, and the inner light reflecting prism sheets 707, 907 and the light reflecting prism sheet 806 in the light reflecting layer form wide effective reflection angles and observation angles.

FIGS. 7, 8 and 9 explicitly show that the inner light reflecting prism sheets 707, 907 and the light reflecting prism sheet 806 in the light reflecting layer are subjected to overlapping incidence light of effective incident angles of LED lamplight from a range of 360 degrees in a traverse direction and a range of about 1 degree to about 179 degrees in a longitudinal direction, and the overlapping incidence light is different from an external illuminating light source in continuous illumination intensity within a time period: and observation angles with light reflected by an object being extended into a light cone pointing backward to a starting point of light rays are different. The overlapping incident light of an LED lamplight light source and an LED lamplight light reflecting light source at effective incident angles on inner light reflecting prism sheets 707, 907 and a light reflecting prism sheet 806 in the light reflecting layer has no mutual exclusion loss with an external illuminating incident light source.

In FIG. 8, a geometric light reflecting prism sheet surface of the light reflecting prism sheet 806 can be processed, such as electroplating so as to increase effective reflection of wide reflection angles of overlapping incident light by the light reflecting prism sheet 806.

In FIG. 9, there is a hollow layer 908 between the light reflecting layer base plane 904 and an upper end light reflecting prism sheet 907, and the light reflecting layer base plane 904 can be made from a non-transparent light-intensified material; and the light reflecting layer base plane 904 and an upper end light reflecting prism sheet 907 and the hollow layer 908 as well as a transparent layer 906 at the upper end of the light reflecting layer are a combination body.

Figure 10:
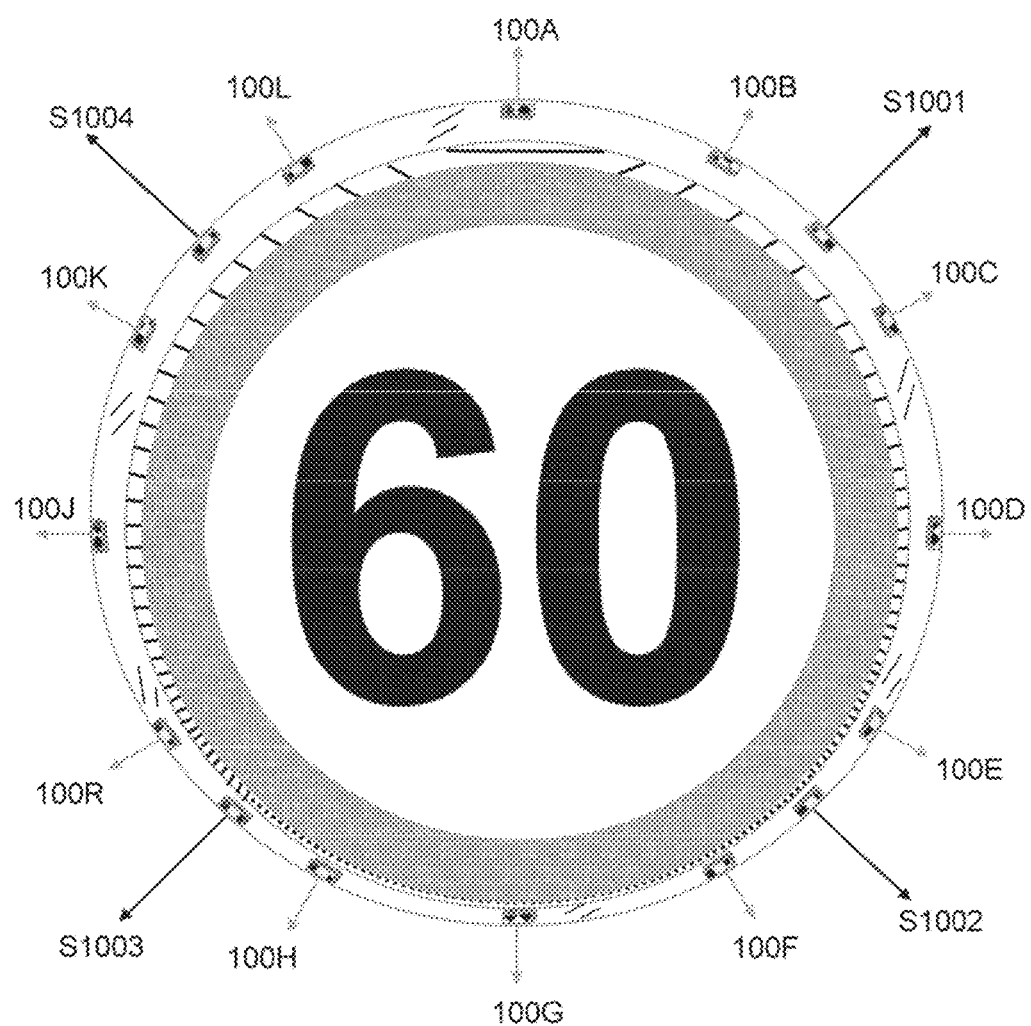
FIG. 10 illustrates sectional view I of a typical product of the present invention.
Figure 11:
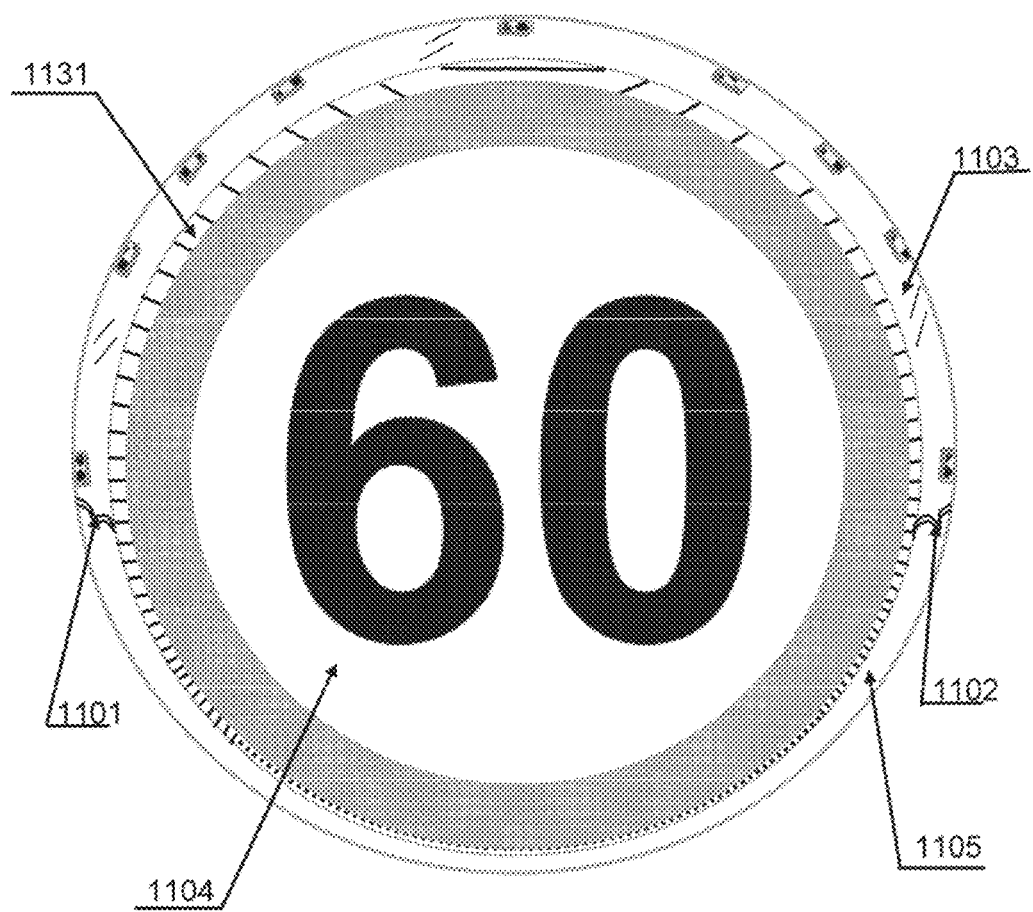
FIG. 11 illustrates sectional view II of a typical product of the present invention.

FIGS. 10 and 11 illustrate sectional views of a typical product of the present invention, and it can be observed through sections 1101 and 1102 of a frame rim layer that a transparent light guide layer 1103 and LED lamp beads 100A, 100B, 100C, 100D, 100E, 100F, 100G, 100H, 100R, 100J, 100K, 100L, S1001, S1002, S1003, S1004 are provided in a frame rim 1105; and a light reflecting layer 1104 is provided below a transparent light guide layer section 1131.

LED lamp beads 100A, 100B, 100C, 100D, 100E, 100F, 100G, 100H, 100R, 100J, 100K, 100L, S1001, S1002, S1003, S1004 are provided in the frame rim 1105, LED lamplight light rays are incident into an inner central point at the periphery, and the first group of LED lamp beads 100A, 100B, 100C, 100D, 100E, 100F, 100G, 100H, 100R, 100J, 100K, 100L are disposed at an interval of 30 degrees at the periphery; and the second group of LED lamp beads S1001, S1002, S1003, S1004 are disposed at an interval of 90 degrees at the periphery.

LED lamp beads can be disposed and added at an interval of 5 degree or an interval multiple of 5 degree at the periphery. In one embodiment, LED lamp beads can be disposed and added at an interval of 1 degree or an interval multiple of 1 degree at the periphery.

According to requirements, LED lamp beads can also be placed and added in the transparent light guide layer 1103 in addition to other areas of peripheral edges.

The thickness of the transparent light guide layer section 1131 is 2-10 mm; and light rays of the LED lamp beads 100A, 100B, 100C, 100D, 100E, 100F, 100G, 100H, 100R, 100J, 100K, 100L, S1001, 81002, S1003, S1004 which are incident from the periphery to a central point is penetrated in the transparent light guide layer section 1131 with a thickness of 2-10 mm. There is a clean transparent light guide layer 1103 on the surface of a light reflecting layer 1104, thereby ensuring that LED effective incident lamplight rays are not obstructed and refracted in the transparent light guide layer 1103.

The light reflecting layer 1104 is subjected to overlapping incidence of lamplight of LED lamp beads 100A, 100B, 100C, 100D, 100E, 100F, 100G, 100H, 100R, 100J, 100K, 100L, S1001, S1002, S1003, S1004 at effective incident angles from a range of 360 degrees in a traverse direction and a range of about 1 degree to about 179 degrees in a longitudinal direction so as to form wide effective reflection angles and observation angles.

The frame rim 1105 can be formed from a metal material or plastic, etc.

Figure 13:
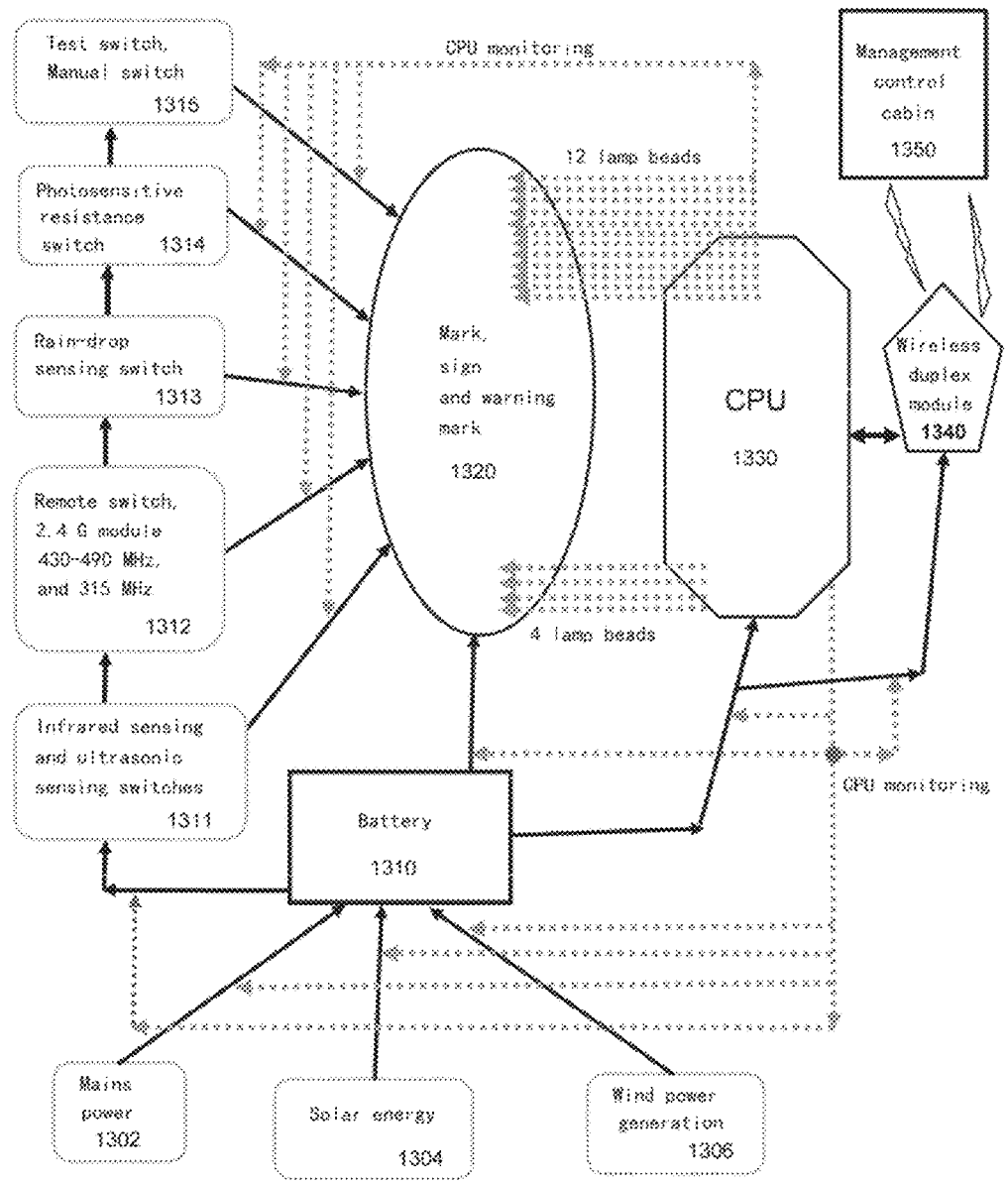
FIG. 13 illustrates a circuit working principle diagram of a typical product of the present invention.

FIG. 13 illustrates a circuit working principle diagram of a typical product of the present invention, in which electronic components are provided on a mark, sign and warning mark device, and various components are connected by a conductive line; a power supply 1310 supplies power to the LED lamp beads on the mark, sign and warning mark device via switches 1311-1315, so as to start a corresponding illuminating mode: and CPU 1330 monitors various working circuits on the mark, sign and warning mark device in real time, and performs data exchange with a management control cabin 1350 via a wireless bidirectional communication module 1340, and the management control cabin 1350 realizes interconnection and intercommunication by means of node remote data transmission, Internet, GSM, etc.

In the circuits, the battery power supply 1310 comes from a connection supply 1302 of mains power, a connection supply 1304 of a solar power generation panel and a connection supply 1306 of a wind-driven generator.

In the circuits, the manners of the switches 1311-1315 supplying power to the LED lamp beads on the mark, sign and warning mark device have: a manual (test) switch 1315—starting a normal working mode and an enhanced working mode; a photosensitive resistance circuit switch 1314—starting the normal working mode: rain-drop sensing circuit switch 1313—starting the enhanced working mode; an infrared sensing circuit switch and ultrasonic sensing circuit switch 1311—starting the enhanced working mode; and 2.4 G, 315 MHz and 430-490 MHz module remote control switch 1312—starting the normal working mode and the enhanced working mode (so as to increase emergency warning in emergency states comprising haze).

The normal working mode of the LED lamp beads on the mark, sign and warning mark device is that a first group of LED lamp beads 100A, 100B, 100C, 100D, 100E, 100F, 100G, 100H, 100R, 100J, 100K, 100L emits light.

The enhanced working mode of the LED lamp beads on the mark, sign and warning mark device is that the first group and a second group of LED lamp beads 100A, 100B, 100C, 100D, 100E, 100F, 100G, 100H, 100R, 100J, 100K, 100L, S1001, S1002, S1003, S1004 emit light.

The second group of LED lamp beads S1001, S1002, S1003, S1004 is complement of the LED illuminating lamp beads in the normal working mode when CPU detects that the LED lamp beads 100A, 100B, 100C, 100D, 100E, 100F, 100G, 100H, 100R, 100J, 100K, 100L are damaged.

The working circuits of the LED lamp beads 100A, 100B, 100C, 100D, 100E, 100F, 100G, 100H, 100R, 100J, 100K, 100L, S1001, S1002, S1003, S1004 emitting light on the mark, sign and warning mark device are all connected in a parallel mode.

CPU 1330 monitors various working circuits on the mark, sign and warning mark device in real time, and performs data exchange with a management control cabin 1350 via a 2.4 G, 430-490 MHz wireless bidirectional communication module 1340, and the management control cabin 1350 realizes interconnection and intercommunication by means of node remote data transmission, Internet, GSM, etc, so as to achieve the predictability of remote intelligent operation and control and apparatus maintenance.

Figure 12:
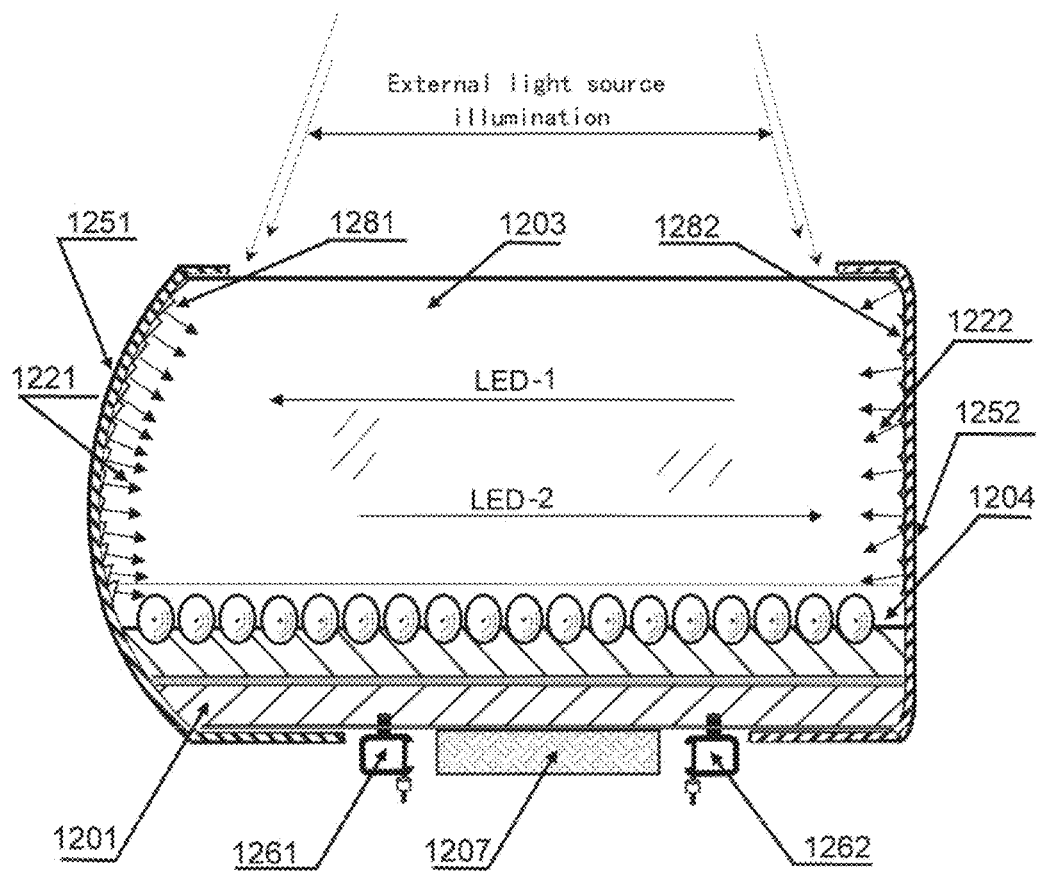
FIG. 12 illustrates embodiments of a working structure of a typical product of the present invention.

FIG. 12 illustrates embodiments of a working structure of a typical product of the present invention: an example of a transparent light guide layer 1203 being adhered to a light reflecting layer 1204 and frame rims 1251, 1252 is casting fusion; an example of a light reflecting layer 1204 being adhered to a warning mark bottom board 1201 is adherence fitting; a reverse side of the warning mark bottom board 1201 is connected to fixing fastening members 1261, 1262; a component circuit electric box 1207 is mounted on the reverse side of the warning mark bottom board 1201; and an LED illuminating light source LED1 and an LED illuminating light source LED2 are provided in a transparent light guide layer 1203.

Frame rims are packaged inward in a C shape, and while the transparent light guide layer 1203 is casting fused with the light reflecting layer 1204 and the frame rims 1251, 1252, the warning mark bottom board 1201 is packaged together in the frame rims.

The materials of the transparent light guide layer 1203 contains fully transparent colourless raw materials, such as acrylic, silica gel and epoxy resin.

The frame rims are packaged inward in a C shape, wherein an inner end face of the frame rim 1251 has a light reflecting coating layer or an inner prism sheet light reflecting layer 1281, and an inner end face of the frame rim 1252 has a light reflecting coating layer or an inner arc-shaped reflecting sheet layer 1282; and the inner prism sheet light reflecting layer 1281 and the inner arc-shaped reflecting sheet layer 1282 can also be independently formed, the inner prism sheet light reflecting layer 1281 and the inner arc-shaped reflecting sheet layer 1282 are adhered to the inner end faces of the frame rims 1251, 1252 so as to be formed integrally, and the surfaces of the inner prism sheet light reflecting layer 1281 and the inner arc-shaped reflecting sheet layer 1282 are subjected to processes, such as plating, coating and electrophoresis.

There are LED lamp beads 100A, 100B, 100C, 100D, 100E, 100F, 100G, 100H, 100R, 100J, 100K, 100L, S1001, S1002, S1003, S1004 fixed at positions aligned with a central point (line) perpendicular to an external edge by 90 degrees in the transparent light guide layer 1203 and on end faces of the inner prism sheet light reflecting layer 1281 and the inner arc-shaped reflecting sheet layer 1282, and conductive lines of the LED lamp beads 100A, 100B, 100C, 100D, 100E, 100F, 100G, 100H, 100R, 100J, 100K, 100L, S1001, S1002, S1003, S1004 are connected into the component circuit electric box 1207 on the reverse side of the wanting mark bottom board 1201.

The LED lamp beads 100A, 100B, 100C, 100D, 100E, 100F, 100G, 100H, 100R, 100J, 100K, 100L, S1001, S1002, S1003, S1004 can be fused together when the transparent light guide layer 1203 is casting fused with the light reflecting layer 1204 and the frame rims 1251, 1252; and another casting fusion can also be performed in concave areas of LED lamp beads positions reserved on a combination body of the transparent light guide layer 1203 with the light reflecting layer 1204 and the frame rims 1251, 1252 which have been casting fused.

LED lamp beads 100A, 100B, 100C, 100D, 100E, 100F, 100G, 100H, 100R, 100J, 100K, 100L, S1001, S1002, S1003, S1004 emit light in the transparent light guide layer 1203 to form the LED illuminating light source LED1 and the LED illuminating light source LED2 within the range of 360 degrees, and when a bundle of the LED illuminating light sources LED1 or a bundle of the LED illuminating light sources LED2 performs illuminating work:

(I) when a bundle of the LED illuminating light sources LED1 performs illuminating work, light reflecting layer micro beads of the light reflecting layer 1204 are subjected to an LED lamplight effective incident angle light source so as to form a light cone pointing backward to a starting point of light rays, which is formed by extending light reflected by an object, and reflect a plurality of light beams at wide angles back to the inner arc-shaped reflecting sheet layer 1282; and the inner prism sheet light reflecting layer 1281 is subjected to the LED illuminating light source LED1, and with reflections via inner prism sheets at different angles, generates an overlapping incident LED lamplight reflecting light source 1221, the light reflecting layer micro beads of the light reflecting layer 1204 are subjected to effective overlapping incidence of a plurality light beams of the LED lamplight reflecting light source 1221, and form a light cone pointing backward to a starting point of light rays, which is formed by extending light reflected by an object, and reflect more beams of light at wide angles back to the inner prism sheet light reflecting layer 1281;

(II) when a bundle of the LED illuminating light sources LED2 performs illuminating work, light reflecting layer micro beads of the light reflecting layer 1204 are subjected to an LED lamplight effective incident angle light source, and form a light cone pointing backward to a starting point of light rays, which is formed by extending light reflected by an object, and reflect a plurality beams of light at wide angles back to the inner prism sheet light reflecting layer 1281; and the inner arc-shaped reflecting sheet light reflecting layer 1282 is subjected to the LED illuminating light source LED2, and with reflections via arc-shaped reflecting sheets at different angles, generates an overlapping incident LED lamplight reflecting light source 1222, the light reflecting layer micro beads of the light reflecting layer 1204 are subjected to effective overlapping incidence of a plurality beams of the LED lamplight reflecting light source 1222, and form a light cone pointing backward to a starting point of light rays, which is formed by extending light reflected by an object, and reflect more beams of light at wide angles back to the inner arc-shaped reflecting sheet light reflecting layer 1282.

By means of the above-mentioned 2 examples, the following can be explicitly disclosed: In a typical product working structure of the present invention, when a bundle of LED illuminating light source LED1 and LED illuminating light source LED2 performs illuminating work, more beams of LED illuminating light sources LED1 can be obtained and more beams of LED illuminating light sources LED2 can be obtained to act on the light reflecting layer 1204, and the light reflecting layer 1204 is subjected to overlapping incidence of numerous beams of LED lamplight at effective incident angles with a range of 360 degrees in the traverse direction and a range of about 1 degree to about 179 degrees in the longitudinal direction so as to form wide effective reflection angles and observation angles.

The entire product shape of the frame rims 1251, 1252 can be constituted by a regular geometry and an irregular geometry.

In this description, the present invention has made a description with reference to the particular embodiments thereof. However, very apparently, various modifications and alternations can still be made without departing from the spirit and scope of the present invention. Therefore, the description and the accompany drawings should be considered to be illustrative but not restrictive.

What is claimed is:

1. A mark and sign illuminating device, comprising:
   a light reflecting layer;
   a first frame rim:
   a second frame rim located opposite the first frame rim with respect to the light reflecting layer;
   a transparent light guide layer disposed on a surface of the light reflecting layer and between the first frame rim and the second frame rim, wherein a first LED illuminating light source LED 1 and a second LED illuminating light source LED2 are provided in the transparent light guide layer;
   wherein the first frame rim is packaged inward in a C shape, an inner end face of the first frame rim facing the transparent light guide layer has a first light reflecting coating layer, and an inner end face of the second frame rim facing the transparent light guide layer has a second light reflecting coating layer.

2. The mark and sign illuminating device according to claim 1, further comprising:
   a warning mark bottom board, wherein a component circuit electric box is mounted on a reverse side of the warning mark bottom board.

3. The mark and sign illuminating device according to claim 2, wherein the warning mark bottom board is packaged together in the first frame rim, and the transparent light guide layer is casting fused with the light reflecting layer and the first and second frame rims.

4. The mark and sign illuminating device according to claim 2, wherein a first group of LED lamp beads and a second group of LED lamp beads are each fixed at positions of illuminating light sources aligned with a central point and line perpendicular to an external edge by 90 degrees in the transparent light guide layer and on end faces of the first light reflecting layer and the second light reflecting layer,
   wherein conductive lines of the first group of LED lamp beads and the second group of LED lamp beads are connected to the component circuit electric box on the reverse side of the warning mark bottom board.

5. The mark and sign illuminating device according to claim 4, wherein the thickness of the transparent light guide layer is 2-10 mm, and the first group of LED lamp beads and the second group of LED lamp beads emit light in the transparent light guide layer to form the first LED illuminating light source LED1 and the second LED illuminating light source LED2 within a range of 360 degrees in a traverse direction.

6. The mark and sign illuminating device according to claim 5, wherein work modes of the first LED illuminating light source LED1 and the second LED illuminating light source LED2 include:
   a first work mode where only the first LED illuminating light source LED1 provides illumination, in which light reflecting layer micro beads of the light reflecting layer are subjected to an LED lamplight effective incident angle light source, and form a light cone pointing backward to a starting point of light rays, which is formed by extending light reflected by an object, and reflect a plurality of light beams at wide angles back to the inner arc-shaped reflecting sheet layer; and the inner prism sheet light reflecting layer is subjected to the first LED illuminating light source LED1, and with reflections via inner prism sheets at different angles, generates an overlapping incident first LED lamplight reflecting light source, the light reflecting layer micro beads of the light reflecting layer are subjected to effective overlapping incidence of a plurality light beams of the first LED lamplight reflecting light source, and form a light cone pointing backward to a starting point of light rays, which is formed by extending light reflected by an object, and reflect more beams of light at wide angles back to the inner prism sheet light reflecting layer;
   a second work mode where only the second LED illuminating light source LED2 provides illumination, in which light reflecting layer micro beads of the light reflecting layer are subjected to an LED lamplight effective incident angle light source, and form a light cone pointing backward to a starting point of light rays, which is formed by extending light reflected by an object, and reflect a plurality beams of light at wide angles back to the inner prism sheet light reflecting layer; the inner arc-shaped reflecting sheet light reflecting layer is subjected to the second LED illuminating light source LED2, and with reflections via arc-shaped reflecting sheets at different angles, generates an overlapping incident second LED lamplight reflecting light source, the light reflecting layer micro beads of the light reflecting layer are subjected to effective overlapping incidence of a plurality beams of the second LED lamplight reflecting light source, and form a light cone pointing backward to a starting point of light rays, which is formed by extending light reflected by an object, and reflect more beams of light at wide angles back to the inner arc-shaped reflecting sheet light reflecting layer; and a third work mode both the first and the second LED illuminating light sources LED1 and LED2 both provide illumination, in which more beams of light from the first LED illuminating light source LED1 can be obtained and more beams of light from the second LED illuminating light source LED2 can be obtained to act on the light reflecting layer, and the light reflecting layer is subjected to overlapping incidence of numerous beams of LED lamplight at effective incident angles from a range of about 1 degree to about 179 degrees in the longitudinal direction so as to form a wide effective reflection angle and observation angle.

7. The mark and sign illuminating device according to claim 4, wherein the fusion between the first group of LED lamp beads and the second group of LED lamp beads are any one of the following:

fused together when the transparent light guide layer is casting fused with the light reflecting layer and the first and second frame rims; or casting fused in concave areas of LED lamp bead positions reserved on a combination body of the transparent light guide layer, the light reflecting layer, and the first and second frame rims, and wherein the transparent light guide layer, the light reflecting layer, and the first and second frame rims have been casting fused to one another.

8. The mark and sign illuminating device according to claim 4, wherein illuminating work modes of the first group of LED lamp beads and the second group of LED lamp beads include:

a normal illuminating work mode, in which the first group of LED lamp beads emit light while the second group of LED lamp beads do not emit light; and an enhanced illuminating work mode, in which the first and second groups of LED lamp beads emit light simultaneously.

9. The mark and sign illuminating device according to claim 4, wherein the second group of LED lamp beads are reserve supplementary lamp beads for the first group of LED lamp beads when it is detected that at least one LED lamp beads in the first group of LED lamp beads are damaged.

10. The mark and sign illuminating device according to claim 4, wherein the supply of power to LED lamp beads in the first and second groups of LED lamp beads comprises one or more of the following:

a normal illuminating work mode and an enhanced illuminating work mode initiated by a manual switch, the normal illuminating work mode initiated by a photosensitive resistance circuit switch, the enhanced illuminating work mode initiated by a rain-drop sensing circuit switch, the enhanced illuminating work mode initiated by an infrared sensing circuit switch and ultrasonic sensing circuit switch, and the normal illuminating work mode and the enhanced illuminating work mode initiated by a 2.4G 315 MHz and 430-490 MHz module remote control switch.

11. The mark and sign illuminating device according to claim 1, wherein the first light reflecting coating layer is an inner prism sheet light reflecting layer, and the second light reflecting coating layer is an inner arc-shaped reflecting sheet layer.

12. The mark and sign illuminating device according to claim 11, wherein the inner prism sheet light reflecting layer and the inner arc-shaped reflecting sheet layer are independently formed.

13. The mark and sign illuminating device according to claim 12, wherein surfaces of the inner prism sheet light reflecting layer and the inner arc-shaped reflecting sheet layer are subjected to at least one process selected from plating, coating and electrophoresis.

14. The mark and sign illuminating device according to claim 11, wherein the inner prism sheet light reflecting layer and the inner arc-shaped reflecting sheet layer are respectively adhered to the inner end faces of the first and second frame rims so as to be formed integrally.

15. The mark and sign illuminating device according to claim 1, wherein the light reflecting layer comprises one of the following:

a combination of a base plane, a finished light reflecting layer, and an upper end transparent layer;

a combination of a base plane and semi-finished light reflecting layer micro beads;

a base plane a printed layer;

a combination of a base plane, an inner light reflecting prism sheet, and an upper end transparent layer;

a combination of a base plane and a light reflecting prism sheet; or a combination of a base plane, an upper end light reflecting prism sheet, a hollow layer, and an upper end transparent layer.

16. The mark and sign illuminating device according to claim 1, wherein the transparent light guide layer is adhered to the light reflecting layer and the first and second frame rims via casting fusion.

17. The mark and sign illuminating device according to claim 1, wherein an entire product shape of the first and second frame rims comprises a regular geometry and an irregular geometry.

18. The mark and sign illuminating device according to claim 1, wherein the first and second frame rims are formed from a metal material or a plastic material.

19. The mark and sign illuminating device according to claim 1, wherein, the power supply of the mark and sign illuminating device includes a main power supply, a solar power generation panel supply and a wind-driven generator supply;

circuits on the mark and sign illuminating device are monitored in real time, and components of the circuits are connected by a conductive line.

* * * * *